Dec. 30, 1952     W. BAGGE ET AL     2,623,296
CENTERING GAUGE
Original Filed July 6, 1946
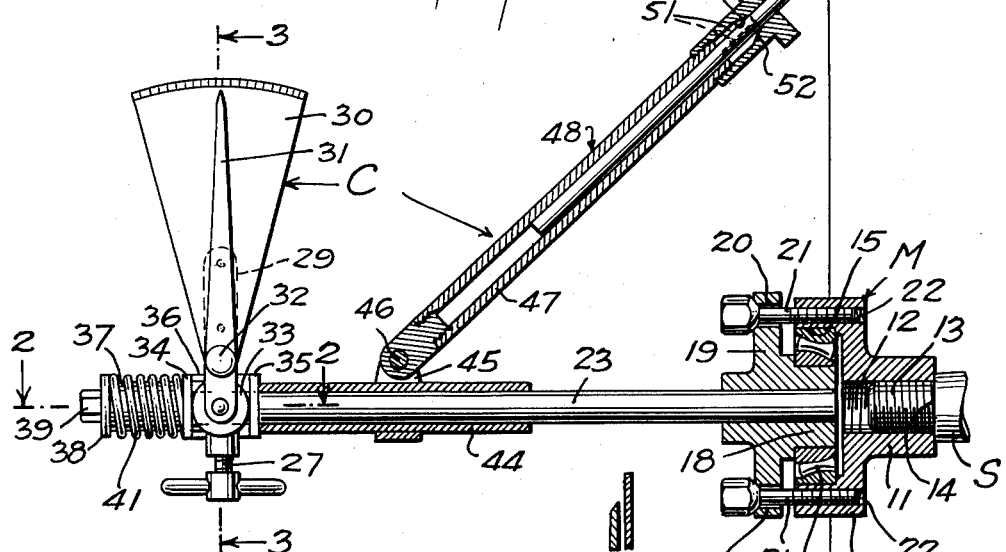
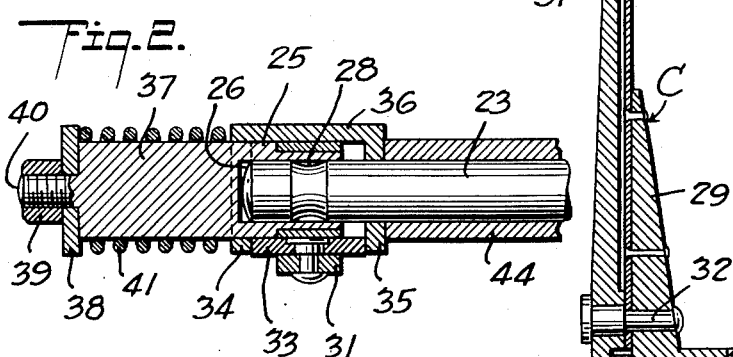
INVENTORS
WALTER BAGGE
GEORGE F. BAGGE
BY
Frederick Diehl
ATTORNEY Patented Dec. 30, 1952

2,623,296

UNITED STATES PATENT OFFICE 2,623,296

CENTERING GAUGE

Walter Bagge and George F. Bagge,
Los Angeles, Calif.

Original application July 6, 1946, Serial No. 681,679. Divided and this application May 29, 1950, Serial No. 164,988

8 Claims. (Cl. 33—180)

This application is a division of our co-pending application for Letters Patent for a Wheel Gage, Serial No. 681,679, filed July 6, 1946.

In our application for Letters Patent above identified, there is disclosed and claimed a wheel gage for determining the camber and caster of vehicle front wheels by an accurate indication regardless of whether or not a wheel is running true, the gage being adapted for operative association with a wheel in a manner to enable various adjustments such as bending or twisting the axle to correct inaccurate camber or caster, to be effected while the gage is applied and is accurately indicating the camber and caster during the adjusting operation. The wheel gage also includes a gage mounting device by which the gage may be rigidly supported from the wheel spindle so that the latter rather than the wheel will be employed as the basis for camber and caster measurements.

The primary object of our present invention is to provide a setting or centering gage, particularly adapted, although not necessarily, for operative association with the above mentioned gage mounting device in a manner to co-act therewith and with the wheel rim in indicating what adjustment, if any, of the gage mounting device relative to the wheel spindle is necessary to establish an alined or co-axial relationship between the gage-supporting axis of the mounting device and the wheel spindle, so as to insure an absolutely accurate basis for camber and caster measurements by the wheel gage.

Another object of our invention is to provide a centering gage for wheel gages, of the above described character, which is of simple, rugged and compact construction, and which is readily applied to the gage mounting device, as well as being conveniently manipulatable to enable the accurate adjustment of the gage mounting device relative to the wheel spindle to be effected with the utmost ease and dispatch.

With these and other objects in view, our invention resides in the combinations, arrangements and functional relationships of elements as set forth in the following specification and particularly pointed out in the appended claims.

In the accompanying drawings,

Figure 1 is a vertical, axial sectional view illustrating one form of centering gage operatively associated with a gage mounting device and showing the latter applied to the spindle of a vehicle wheel;

Figure 2 is an enlarged fragmentary sectional view taken on the line 2—2 of Figure 1; and Figure 3 is an enlarged vertical transverse sectional view taken on the line 3—3 of Figure 1.

Referring specifically to the drawings, our invention in its present embodiment is shown, for the purpose of illustration, associated with a gage mounting device M composed of an adapter member or flange 10 having a hub 11 provided with a threaded bore 12 enabling the member 12 to be screwed onto the reduced threaded end 13 of a wheel spindle S to abut the annular shoulder 14 of the spindle. In practice, several of the flanges 10 may be provided with threaded bores 12 to fit spindle threads 13 of different diameters and pitches so as to enable the mounting device M to be applied to such spindles with a minimum number of the flanges 10.

The flange 10 has an annular recess 15 adapted to receive the outer race of a conventional self-alining bearing 17, the inner race of which is fixed on the hub 18 of a head 19 provided with a circular series of openings 20 freely receiving the threaded shanks of adjusting cap screws 21 screwed into threaded bores 22 in the flange 10. Projecting rigidly and axially from the hub 18 is a gage mounting extension in the form of a round shaft 23. By means of the screws 21 the shaft 23 can be angularly adjusted about the bearing 17 which broadly constitutes a ball-and-socket or knuckle joint connection between the adapter member 10 and the shaft 23, all to the end of enabling the shaft to be disposed and locked in axial alinement with the axis of the wheel spindle S.

The centering gage embodying our present invention is designated generally at C and facilitates centering of the mounting device M on the wheel spindle S. The centering gage comprises an indicator composed of a support 25 having a socket 26 slidably receiving the outer end of the shaft 23 and adapted to be rigidly secured to the shaft by means of a clamping screw 27 threaded through the support and adapted to seat in an annular groove 28 formed in the shaft. The support 25 includes a rigid extension 29 to which is fixed one indicating element in the form of a graduated dial 30 with which co-acts a second indicating element in the form of an arm 31 pivotally mounted on the support by a pin 32, and carrying a rotatably mounted roller 33 at its end opposite to the indicating end of the arm.

The roller 33 is disposed between the two spaced ears 34 and 35 of a U-shaped slide 36 slidably mounted on the axial extension 37 of the support 25 and receiving the shaft 23. A stop washer 38 is secured by a nut 39 on the reduced and threaded end 40 of the extension 37, and provides an abutment for one end of a coil spring 41 mounted on the extension 37. The other end of the spring 41 bears against the slide 36 to urge the latter axially in one direction, which, in the applied position of the indicator, is towards the spindle S, for co-action with the roller 33 in moving the indicating arm 31 in one direction over the dial 30.

The centering gage C also includes an actuator for the above described indicator which comprises a bearing member in the form of a sleeve 44 adapted to be rotatably mounted and axially slidable on the shaft 23 between the slide 36 and the head 19 of the gage mounting device M. The sleeve 44 has laterally projecting ears 45 on which is pivotally mounted by means of a pin 46, one end of the tubular section 47 of a member in the form of an extensible arm 48, the other rod section 49 of which telescopically co-acts with the section 47 and has its outer end pointed for engagement with the tire rim R (Figure 1).

The outer end of the tubular section 47 is threaded to receive a nut 50 which is mounted on the rod section 49. The outer end of the section 47 is also split longitudinally at 51 to render it constrictable, and its periphery is beveled to provide an annular wedge cam 52 on which the complementarily beveled annular cam surface 53 on the nut 50 rides when the nut is screwed onto the section 47, all to the end of clamping the sections 47 and 49 in a selected position of relative axial adjustment.

With the actuator and indicator of the centering gage applied to the shaft 23 as shown in Figure 1, the arm 48 is adjusted against the rim R until the slide 36 has been moved axially against the spring 41 to center the indicating arm 31 on the dial 30. With the arm 48 locked in this adjusted position by the nut 50, the wheel W is rotated, thus rotating the arm 48 and the sleeve 44 with it. Should the shaft 23 not be in axial alinement with the wheel spindle S, this fact will be indicated by a back and forth swinging of the indicating arm 31 over the dial 30, first to one side and then to the other of the mid position.

Suitable adjustment of the screws 21 of the mounting device M is now made until the indicating arm 31 remains stationary as the wheel is rotated, to thus indicate perfect alinement between the axis of the shaft 23 and the axis of the spindle S. The centering gage may now be removed in its entirety from the shaft 23 so as to leave the latter free to receive the wheel gage (not shown) for measuring camber and caster of the wheel.

We claim:

1. A centering gage for a wheel gage mounting device having a wheel gage supporting extension defining an axis and adapted to be secured to a wheel spindle for angular adjustment to a position of alinement of its axis with the axis of the spindle, said centering gage comprising: an arm adapted to engage a part of the wheel at a location eccentric of the wheel axis; a bearing sleeve on which said arm is pivoted, adapted to be mounted on said extension of said wheel gage mounting device to shift axially upon the extension when the wheel is rotated with said extension disalined from the spindle axis; and an indicator including a support adapted to be secured to said extension; indicating means mounted on the support; an actuator axially movable on the support and operatively connected to the indicating means to move same; and means on the support urging the actuator in one direction to effect one movement of the indicating means; said actuator being engaged by said bearing sleeve for movement in the opposite direction in response to said axial shifting of the bearing member, so as to effect opposite movement of the indicating means, whereby the latter will indicate the disalinement of the extension and spindle axes.

2. A centering gage for a wheel gage mounting device having a wheel gage supporting extension defining an axis and adapted to be secured to a wheel spindle for angular adjustment to a position of alinement of its axis with the axis of the spindle, said centering gage comprising: a support; means for securing said support to said extension; indicating means including one element fixed to the support, and a second element mounted for movement on the support to co-act with said one element; means mounted on said extension to revolve about the axis of the extension and to shift axially thereof; the last said means including a member engageable with a portion of the wheel at a location eccentric of the wheel axis; and means responsive to axial shifting of the last said means on the extension that occurs when the axis of the latter is disalined from the spindle axis and said last means is revolved with the wheel, to actuate said second indicating element for co-action with said one indicating element in indicating the disalinement.

3. A centering gage for a wheel gage mounting device having a wheel gage supporting extension defining an axis and adapted to be secured to a wheel spindle for angular adjustment to a position of alinement of its axis with the axis of the spindle, said centering gage comprising: a support; means for securing said support to said extension; indicating means including a graduated dial fixed to the support, and an indicating arm pivotally mounted on the support for co-action with said dial; a member engageable with a portion of the wheel at a location eccentric of the wheel axis; means for mounting said member on said extension to revolve about the axis of the extension and be movable axially relative to the extension; and means operatively connecting the last said means to said indicating arm to move same relative to said dial when the axis of the extension is disalined from the spindle axis and said member is revolved with the wheel, for co-action of said dial and indicating arm in indicating the disalinement.

4. A centering gage for a wheel gage mounting device having a wheel gage supporting extension defining an axis and adapted to be secured to a wheel spindle for angular adjustment to a position of alinement of its axis with the axis of the spindle, said centering gage comprising: a support; means for securing said support to said extension; indicating means including a graduated dial fixed to the support and an indicating arm pivotally mounted on the support for co-action with said dial; a member engageable with a portion of the wheel at a location eccentric of the wheel axis; a sleeve to which said member is connected, mounted on said extension; means urging the indicating arm in one direction; and means co-acting with said sleeve in moving the indicating arm in the opposite direction should the axis of the extension be disalined from the spindle axis when said member is revolved with the wheel, for co-action of said dial and indicating arm in indicating the disalinement.

5. A centering gage for a wheel gage mounting device having a wheel gage supporting extension defining an axis and adapted to be secured to a wheel spindle for angular adjustment to a position of alinement of its axis with the axis of the spindle, said centering gage comprising: a support; means for securing said support to said extension; indicating means including a graduated dial fixed to the support, and an indicating arm pivotally mounted on the support for co-action with said dial; a roller carried by said indicating arm; a slide adapted to be mounted on said extension and having portions between which said roller is interposed; a spring urging said slide in one direction to accordingly move the indicating arm in one direction; a member engageable with a portion of the wheel at a location eccentric of the wheel axis; and means engageable with said slide and operatively connected to said member to mount the latter on said extension to revolve about the axis of the extension and be movable axially relative to the extension in response to a disalined condition between the axes of the extension and spindle when the member is revolved with the wheel, so as to move the indicating arm in the opposite direction against the action of said spring.

6. A centering gage for a wheel gage mounting device having a wheel gage supporting extension defining an axis and adapted to be secured to a wheel spindle for angular adjustment to a position of alinement of its axis with the axis of the spindle, said centering gage comprising: a support; means for securing said support to said extension; indicating means including a graduated dial fixed to the support and an indicating arm pivotally mounted on the support for co-action with said dial; a roller carried by said indicating arm; a slide adapted to be mounted on said extension and having spaced ears between which said roller is interposed; a spring mounted on said support and co-acting with said slide to urge the indicating arm in one direction; a member engageable with a portion of the wheel at a location eccentric of the wheel axis; a sleeve adapted to be mounted on said extension and engageable with said slide; and means pivotally connecting said member to said sleeve for co-action therewith in moving the indicating arm in the opposite direction should the axes of the extension and spindle be disalined when said member is revolved with the wheel, whereby said dial and indicating arm will co-act in indicating the disalinement.

7. A centering gage for a wheel gage mounting device having a wheel gage supporting extension defining an axis and adapted to be secured to a wheel spindle for angular adjustment to a position of alinement of its axis with the axis of the spindle, said centering gage comprising: indicating means including co-acting relatively movable indicating parts; means for securing one of said parts to said extension; a member engageable with a portion of the wheel at a location eccentric of the wheel axis; and means co-acting with said member and with the other indicating part, to cause the latter and said one indicating part to indicate a disalined condition between said extension and spindle when said member is revolved with the wheel.

8. A centering gage for a wheel gage mounting device having a wheel gage supporting extension defining an axis and adapted to be secured to a wheel spindle for angular adjustment to a position of alinement of its axis with the axis of the spindle, said centering gage comprising: indicating means including co-acting relatively movable indicating parts; means for securing one of said parts to said extension; an extensibly adjustable arm engageable at one end with a portion of the wheel at a location eccentric of the wheel axis; and means including a sleeve to which the other end of said arm is pivotally connected, adapted to be mounted on said extension for co-action with said other indicating part in causing the latter and said one indicating part to indicate a disalined condition between said extension and spindle when said member is revolved with the wheel.

WALTER BAGGE.
GEORGE F. BAGGE.

REFERENCES CITED

The following references are of record in the file of this patent:

UNITED STATES PATENTS

| Number | Name | Date |
|---|---|---|
| 603,782 | Brown | May 10, 1898 |
| 2,176,357 | Palmer | Oct. 17, 1939 |